United States Patent [19]

Antonazzi

[11] Patent Number: 4,618,856
[45] Date of Patent: Oct. 21, 1986

[54] STALL SURGE DETECTOR

[75] Inventor: Frank J. Antonazzi, South Bend, Ind.

[73] Assignee: Allied Corporation, Morristown, N.J.

[21] Appl. No.: 729,846

[22] Filed: May 3, 1985

[51] Int. Cl.[4] .............................................. G08B 21/00
[52] U.S. Cl. ...................................... 340/626; 73/115;
340/966; 364/431.02
[58] Field of Search ................... 340/626, 966; 73/115,
73/116, 701, 708, 718, 724, 733, 745, 753, 180;
364/431.02

[56] References Cited

U.S. PATENT DOCUMENTS

| | | | |
|---|---|---|---|
| 3,867,717 | 2/1975 | Moehring et al. | 340/966 X |
| 4,296,600 | 10/1981 | Abo et al. | 364/431.02 X |
| 4,322,977 | 4/1982 | Sell et al. | 73/701 |
| 4,422,125 | 12/1983 | Antonazzi et al. | 73/718 X |
| 4,422,335 | 12/1983 | Ohnesorge et al. | 73/724 |
| 4,434,664 | 3/1984 | Antonazzi | 73/701 |
| 4,449,409 | 5/1984 | Antonazzi | 73/724 |
| 4,457,174 | 7/1984 | Bar-Cohen et al. | 73/598 |
| 4,457,179 | 7/1984 | Antonazzi et al. | 73/701 |

Primary Examiner—James L. Rowland
Assistant Examiner—Daniel Myer
Attorney, Agent, or Firm—Ronald D. Welch; Ken C. Decker

[57] ABSTRACT

In a pressure measuring system which includes a pressure transducer for generating an analogue signal as a function of pressure, circuitry for generating a non-linear error signal as a function of the difference between the input signal and a feedback signal, a feedback circuit which generates the feedback signal as a function of said error signal to null the error signal and generates a digital output signal as a function of the pressure, a pressure surge detecting circuit having an amplitude detector connected to said pressure measuring system to receive the error signal and generating an output signal when the error signal is equal to and greater than a predetermined magnitude; a timer circuit connected to receive said output signal and generate an alarm signal when the output signal continues for a predetermined period of time, a digital computing circuit connected to receive the digital output signal for computing the rate of change of pressure and the change in pressure, a memory circuit storing predetermined maximum and minimum values of the rate of change and change of pressure, respectively, the computing circuit effecting comparison of the computed values of rate of change and change in pressure to stored values to generate first and second computed output signals when both are in excess of the stored values, the timer means being connected to receive at least one of the computed output signals to generate the alarm signal when the computed output signals continue for a predetermined period of time.

11 Claims, 3 Drawing Figures

STALL SURGE DETECTOR

The present invention relates in a broad context to devices for measuring pressure and, in particular, to a device for detecting a pressure surge such as may occur in the compressor of a turbine engine.

A pressure surge or pressure change characterized by its rapidity and magnitude can occur in many physical systems. In some systems such pressure surges are normal, while in others such surges are abnormal and indicative of a condition which must be corrected. For example, even the most sophisticated turbine engines can experience what is commonly referred to as a stall surge. A stall surge, in its simplest terms, is a condition in which the compressor stalls and ceases to pump or compress air. Such a stall surge occurs very rapidly, can cause backfiring of the engine, asymmetrical thrust on a multi-engine airplane having axially displaced engines, and can be disastrous if not quickly corrected. Typically, correction must occur within about one hundred milliseconds to obviate any significant effect on the operation of the aircraft.

Contemporary turbine engines are further provided with highly sophisticated fuel or energy control systems which measure a variety of parameters of the engine. Included in such control systems are highly accurate pressure sensing devices or systems. For example, particularly advantageous pressure measuring systems are described in commonly assigned U.S. Pat. Nos. 4,322,977 entitled "Pressure Measuring System", filed May 27, 1980 in the names of Robert C. Sell, John R. Sheller, and John M. Juhasz, U.S. Pat. No. 4,434,664, issued Mar. 6, 1984 entitled "Pressure Ratio Measurement System", in the name of Frank J. Antonazzi, U.S. Pat. No. 4,422,335, issued Dec. 27, 1983, entitled "Pressure Transducer", U.S. Pat. No. 4,449,409, entitled "Pressure Measurement System with a Constant Settlement Time", in the name of Frank J. Antonazzi, and U.S. Pat. No. 4,457,179, issued July 3, 1984, entitled "Differential Pressure Measuring System", issued to Joseph Bluish and Frank J. Antonazzi and U.S. Pat. No. 4,422,125, issued Dec. 20, 1983, entitled "Pressure Transducer with an Invariable Reference Capacitor", issued to Frank J. Antonazzi and David H. Ohnesorge. While a wide variety of pressure measuring devices can be used in conjunction with the present invention, the disclosures of the above-identified patents are hereby expressly incorporated by reference herein for a full and complete understanding of the operation of the invention. These pressure measuring systems all comprise a configuration of pressure sensitive devices or impedances which output a signal to a summing junction as a function of the measured parameter. The output from the summing junction is an error signal representative of the difference between the output signal from the pressure sensitive impedance and a feedback signal. The error signal and nulling signal are non-linear and produce a substantially constant percent of point or percent of scale accuracy in the pressure measurement. The error signal is amplified and processed by appropriate filters and digital circuitry. Characteristic of these pressure measuring systems is that there is a specific period of time required to null the circuit and provide a measurement of the input pressure occasioned by the digital processing and nulling of the error signal. Accordingly, while these pressure measuring systems have high accuracy and reliability, they are also characterized in that they do not produce an instantaneous indication of pressure and may be too slow in response to provide a signal indicative of a stall or other pressure surge.

Accordingly, there exists a need to devise a pressure measuring system which has both the necessary accuracy and reliability of the aforementioned pressure measuring systems and which, simultaneously, has a substantially increased response time, and in particular, a response time of 20 or less milliseconds.

SUMMARY OF THE INVENTION

The invention provides a pressure surge detector for detecting a rapid and significant pressure change such as a stall surge condition in a turbine engine. The detector is incorporated in an analogue, digital pressure measuring system which includes a capacitive pressure transducer having a pressure variable sensing capacitor and a substantially invariable reference capacitor. The capacitors are excited by out-of-phase signals and the outputs of the capacitors are combined in a summing junction to produce an error signal which subsequent to processing is used to produce an error signal which effects digital incrementation of a counter. The counter output is converted to a non-linear feedback signal used to null the error signal via the feedback capacitor(s) and summing junction. The pressure surge detector includes an amplitude detector connected to the pressure measurement system to receive the error signal, the amplitude detector generating an output signal when the error signal is equal to and greater than a predetermined magnitude. A timer circuit is connected to receive the output signal of the amplitude detector and generates an alarm signal when the output signal continues at or above a predetermined amplitude and for a predetermined period of time.

The pressure surge detector additionally includes a computing circuit connected to receive the pressure output signal of the pressure measuring system for computing the time derivative of the pressure and the change in pressure, comparing these values to predetermined stored values and generating a second alarm signal when the computed derivative of the pressure and the pressure change deviate from prescribed norms.

In a specific embodiment, the first and second alarm signals are logically combined through a plurality of logic gates and the timer circuit to provide a surge signal in response to either or both the alarm signals.

Because the error signal is a substantially instantaneous signal proportional to the change in capacitance of the sensing capacitor for a finite time period and the amplitude detector and logic gates operate substantially instantaneously, the pressure surge detector of the present invention provides a virtually instantaneous indication of rapid and large changes which indication can then be precisely time measured to determine the existence of an abnormal pressure surge within the time period allowable for correction thereof. Simultaneously, the digital computing portion of the circuit, because it has high accuracy but slower response, will provide a similar indication when the magnitude of the surge is marginal but occurs less rapidly.

It is therefore an object of the invention to provide a pressure surge detector for use in detecting a pressure surge in a device provided with a pressure measuring system.

It is another object of the invention to provide such a detector for use with a pressure measuring system which includes a pressure variable sensing capacitor and reference capacitor network excited by a common energy source the output signals of which are summed to produce an error signal, the error signal being digitally processed to produce a feedback signal to null the error signal and provide a digital indication of pressure.

Yet another object of the invention is to provide such a detector connected to the analogue portion of a digital pressure measuring system to receive the error signal and to generate an alarm signal when the error signal exceeds a predetermined amplitude for a predetermined period of time.

Still another object of the invention is to provide a detector which includes a computational circuit connected to receive the pressure signal from a digital pressure measuring system to compute therefrom the time differential of the pressure and change in pressure and compare these to predetermined norms and generate an error signal when these signals deviate from said norms.

Another object of the invention is to provide such a detector which includes combinational logic circuitry for generating pressure surge alarm signals in response to either or both of the first and second alarm signals.

These and other objects, features and aspects of the invention will be more clearly understood and better described in view of the following specifications taken in conjunction with the appended drawings wherein:

DESCRIPTION OF THE PREFERPED EMBODIMENT

Figures 1, 2, 3:
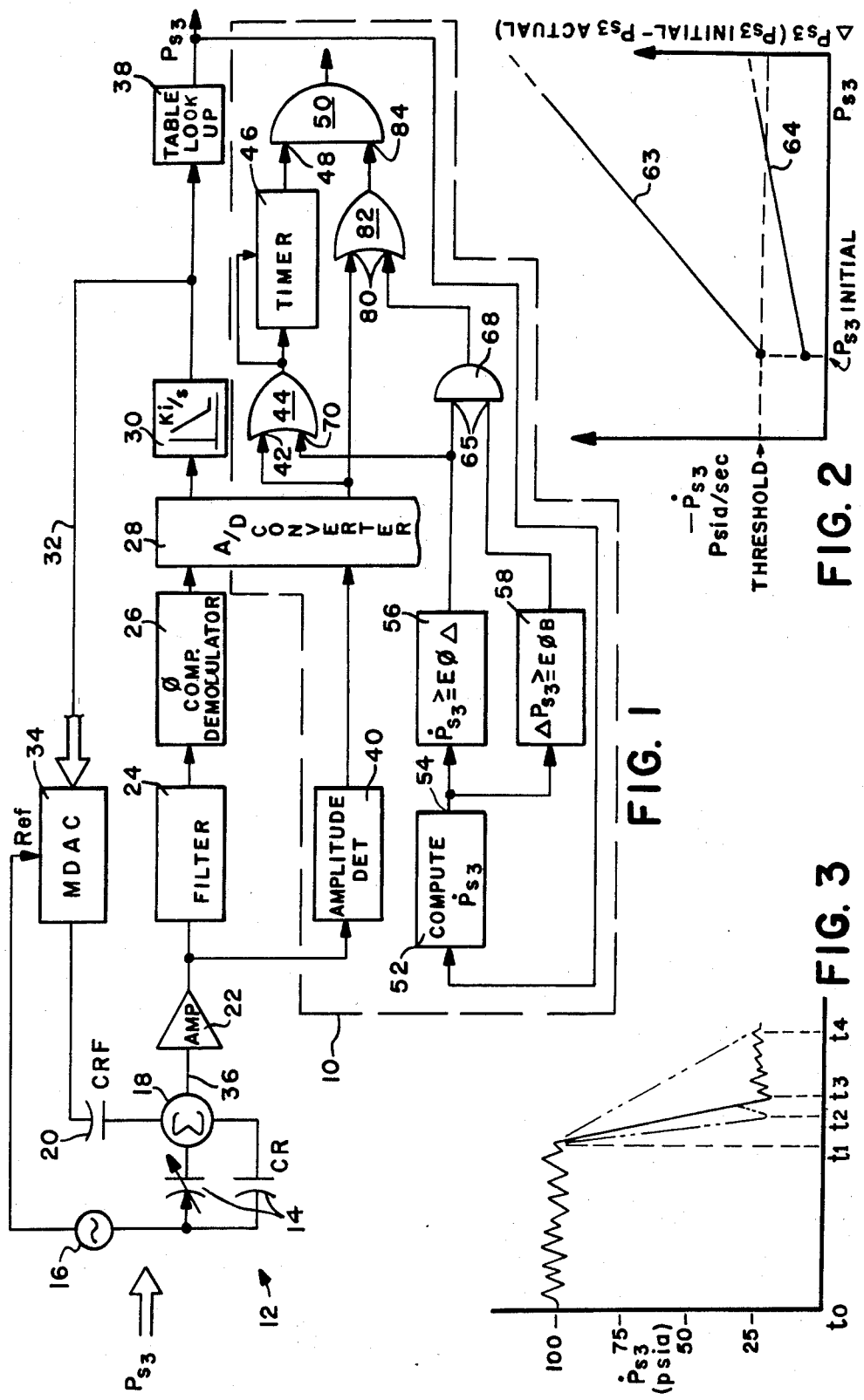
FIG. 1 is a block diagram of a pressure surge detector in accordance with the present invention shown connected to a pressure measuring system.
FIG. 2 is a graphical representation of the pressure rate and pressure change norms of a turbine engine.
FIG. 3 is a graphical representation of a typical turbine compressor output pressure exhibiting stall surge events.

Referring now to the drawings, there is shown in FIG. 1 a block diagram of a pressure surge detector circuit indicated generally at 10 connected to a pressure measuring system 12 such as that described in the above-referenced commonly assigned U.S. Patents, the pressure measuring system 12 being shown in simplified form.

Briefly, the pressure measuring system 12 comprises a pressure variable capacitor 14 formed within a quartz crystal (not shown) which also includes therein a substantially constant reference capacitor 20. A stable, alternating current reference voltage is applied to one terminal of the capacitor 14 from a reference source 16 and the output voltage from capacitor 14 is passed into a summing junction 18 wherein it is nulled against a feedback voltage received from reference capacitor 20. The output from the summing junction 18 is fed through an amplifier 22, a filter circuit 24, and phase comparator-demodulator 26. The alternating current signal from comparator-demodulator 26 is then passed into an analogue to digital converter 28 to produce an equivalent digital signal. The digital output signal from the analogue to digital convertor 28 is then applied to a microprocessor based computer circuit 30 in which the digital signal is converted into a binary number or count N, which is a non-linear function of the pressure applied to the pressure variable capacitor 14. This digital number N is passed via a feedback path 32 to a multiplying digital to analogue convertor 34 where it is converted into an analogue signal which is applied to the feedback capacitor 20. This analogue voltage signal which is also derived from the reference source 16, is 180° out of phase with the signal applied to the sensing capacitor 14, and is applied to the summing junction 18 to null the output signal from the pressure variable capacitor 14. When the output voltage which appears at the output 36 of the summing junction 18 is zero, the output N from the computing circuit 30 is representative of the pressure applied to the pressure variable capacitor 14. This count is then inputed to a memory device 38 wherein the count N is converted to a pressure signal herein denoted as $P_s3$.

Significant herein is that $P_s3$ is representative of a specific pressure such as the static outlet pressure of a turbine compressor. It is also significant to note that because the pressure system 12 is digital, the pressure $P_s3$ is not an instantaneous signal but rather is a signal that appears after appropriate digital manipulations have been performed to produce the nulling signal at the output of the feedback capacitor 20. In a working embodiment of the pressure measuring system, the frequency response of the pressure measuring system 12 is between fourteen and forty-five Hertz. That is, when an error signal occurs at the output 36 of the summing junction 18, a nulling signal is established after a period of between 70 and 22 milliseconds.

Connected directly to the output of amplifier 22 is an amplitude detector circuit 40. The output from the amplitude detector is passed through the analogue to digital convertor 28 and into one of the inputs 42 of an OR gate 44. The output of gate 44 is passed to the input of a timer 46, the latter's output being applied to one input 48 of an AND gate 50.

Simultaneously, the output pressure signal $P_s3$ from table look up device 38 is passed to the input of a microprocessor based computing device 52 wherein the $P_s3$ signal is differentiated to produce a time derivative signal thereof. This time derivative signal, $(\dot{P}_s3)$ appearing at output terminal 54 is then applied to the inputs of two additional memory devices 56, 58, wherein the time derivative signal $\dot{P}_s3$ is compared to predetermined stored values derived from the relationship illustrated graphically as curve 63 in FIG. 2, and simultaneously, the change in the value of $P_s3$, denoted $\Delta P_s3$, is compared to stored values in a look up table containing data derived from curve 64 illustrated in FIG. 2.

The curves shown in FIG. 2 are based upon empirical data and represent the criteria of a pressure surge condition, this condition being indicated when the rate of change of pressure $\dot{P}_s3$ exceeds the valves indicated by curve 63 for a predetermined period (typically 20 MSEC) and the change in pressure $\Delta P_s3$ is in excess of the value represented by curve 64 at an initial pressure $P_s3$. Initial pressure is defined as the value of $P_s3$ when $P_s3$ exceeds a predetermined minimum. It should be noted that both $\dot{P}_s3$ and $\Delta P_s3$ are negative since they are based on values of pressure decrease.

The outputs from the memory devices 56, 58, are then simultaneously applied to the input 65 of an AND gate 68 and the output of memory device 56 is applied to the other input 70 of OR gate 44. The output from AND gate 68 and the output from amplitude detector 40 are similarly, simultaneously applied to the inputs 80 of another OR gate 82 whose output is applied to the other input terminal 84 of the AND gate 50. The output from AND gate 50 is the desired pressure surge alarm signal.

Referring now to FIG. 3, there is shown graphically the static pressure $P_s3$ which appears at the output of a compressor of a turbine engine. Values shown are only typical and not exclusive. Under normal operating conditions, the outlet pressure of the turbine compressor will be as shown between time periods $t_0$ and $t_1$. In the illustrated pressure diagram, this pressure is nominally 100 pounds. The pressure does, however, cycle rapidly within determinable limits about the nominal pressure creating a pressure noise condition.

Upon the occurrence of a stall surge in the engine, the pressure $P_s3$ will drop rapidly to a low value (25 pounds in the illustrated pressure curve). This rapid drop in pressure, which occurs between times $t_1$ and $t_3$ may occur over a period of 20 to 40 milliseconds after which time the pressure will remain at a reduced level until the engine recovers. Such recovery of the engine in a very brief period of time is essential to smooth and safe operation of the aircraft. Accordingly, it is desireable to detect the stall surge condition and provide remedial measures such as, for example, injecting a burst of additional fuel or alteration of compressor geometry. In some instances, it is possible for the pressure to drop more rapidly such as indicated between in times $t_1$ and $t_2$, such a condition occurring in catastrophic situations such as for example a blow-back in the engine or more slowly as between times $t_1$ and $t_4$.

The pressure sensing capacitor 14 is connected to sense the pressure at the output of the stator or compressor and therefore responds to the pressure curve of FIG. 3. In a normal sequence, this pressure will be sampled at a frequency between 14 and 45 Hertz or once every 22 milliseconds to as infrequently as once each 70 milliseconds. As will be recognized from the disclosures of the above-referenced U.S. patents, this pressure $P_s3$ is computed to a very high degree of accuracy. Correspondingly, the computation of $P_s3$ is also a highly accurate computation such that an accurate determination can be made as to whether the pressure lies in the correct operating range as established by the curves 63, 64 shown in FIG. 2. In the event that the pressure rate should exceed the curve 63 at a specific initial pressure, and on the condition that the change in pressure exceeds curve 64, a pressure deviation signal will be produced by the logical combination of the outputs of the memory devices 56, 58.

The time differential signal outputed by memory device 56 is simultaneously applied to the OR gate 44 and subsequently to the timer 46. If the condition should continue for a period of 20±5 milliseconds, it has been determined that a stall surge alarm condition exists. Initiation of the timing period is effected from the amplitude detector 40 as described below. Accordingly, the signal from the memory device 56 will produce this alarm signal in the event that it continues for the time duration established by the timer 46 which is, accordingly, appropriately selected to have a time period of 20 plus or minus 5 milliseconds.

Simultaneously, the output from AND gate 68 is passed to the OR gate 82 to the other input of the AND gate 50. Accordingly, simultaneous timing out of the timer 46 and the continuing occurrence of outputs from the two memory devices 56, 58 will produce the stall surge alarm signal required to trigger modification of the engine operating parameters to remedy the stall surge condition.

The signal being applied to the amplitude detector 40 is an instantaneous signal. That is, it is a signal which, on a time basis, is concurrent with the pressure changes occurring at the output of the compressor turbine. If this signal should exceed a predetermined minimum threshhold, an output signal will be produced from the amplitude detector 40. The amplitude required to trigger the amplitude detector 40 is accordingly selected to be a voltage signal corresponding to a pressure rate of change $(P_s3)$ in excess of that denoted by curve 63. Since the error signal and the nulling signal are non-linear and, as explained in the above-referenced commonly assigned patents, the error signal is greater in proportion to pressure changes at low pressure than at higher pressures, it will be seen that a constant value of error signal corresponds to a progressively higher rate of change of pressure. This in turn is compatible with the requirement of curve 63 for $P_s3$. This signal is subsequently applied through OR gate 44 to the timer 46 causing the timer to commence its timing period. If signal continues for the timing period (20±5 miliseconds), an output signal appears at the output of the timer 46 and is applied to one input of the AND gate 50. If a signal from the output of the amplitude detector 40 continues, the signal is simultaneously applied through OR gate 82 to the other input 84 of AND gate 50, the simultaneous occurrence of signals at terminals 48 and 84 also producing, alternatively, the appropriate alarm signal. This portion of the detector circuit has a lower accuracy than the portion comprising the computing circuit 52 and memory devices 56, 58 in view of the lower accuracy of the amplitude detector 40. However, this portion of the circuit also has a faster response time since there is no computational delay required to produce and null the error signal. Accordingly, the circuit will respond to very rapid rates of change of the input pressure. Since such rapid rates of change will have values substantially above curve 63, the reduced accuracy is acceptable.

From the above description, it will now be seen that the pressure surge detector of the present invention provides a relatively simple yet effective means for monitoring the pressure and producing an alarm signal in the event that pressure changes fall outside predetermined parameters. The circuit can be adapted for different pressure ranges by simple software modification of the contents of the memory devices 56, 58, and alteration of the triggering amplitude of the amplitude detector circuit 40. The circuit provides both a highly accurate rate of change indication which will produce the appropriate pressure surge alarm signal under marginal surge conditions. Simultaneously, in more severe situations, the surge detector will provide a very rapid, substantially instantaneous indication of the pressure surge condition via the non-computational level detector circuit. While this alarm signal has less accuracy than the computationally derived alarm signal, it is produced only under situations wherein deviations from the desired operating parameters are large and high accuracy is not required.

The entire circuit can easily be adapted to existing pressure sensing devices such as described in the above-referenced U.S. patents with a minimum of parts, added complexity, or other modifications of the fuel control system and has particular application to fuel controls for turbine engines, other applications, however, being apparent.

While a detailed description of the preferred embodiments has been disclosed, it will be obvious to those skilled in the art that various modifications and changes may be made thereto without departing from the scope and spirit of the invention as hereinafter defined in the appended claims.

I claim:

1. For use in a pressure measuring system which includes a pressure transducer for generating an instantaneous analogue signal as a function of pressure, means for generating non-linear error signal as a function of the difference between the input signal and a feedback signal and, means including feedback circuit means for generating said feedback signal as a function of said error signal for nulling said error signal and generating a digital output signal as a function of said pressure, a pressure surge detecting circuit comprising; amplitude detector means connected to said pressure measuring system to receive said error signal for generating an output signal when said error signal is equal to and greater than a predetermined magnitude; and timer means connected to receive said output signal for generating an alarm signal when said output signal continues for a predetermined period of time.

2. The pressure surge detecting circuit of claim 1 further including digital computing circuit means connected to receive said digital output signal for computing the rate of change of said pressure and the change in said pressure, memory circuit means for storing predetermined maximum and minimum values of the rate of change and change of pressure, respectively, said computing circuit means further including means for comparing the computed values of said rate of change and change in pressure to said predetermined stored values thereof, and generating first and second computed output signals when both are in excess of said stored values, said timer means being connected to receive one of said computed output signals for generating said alarm signal when said one of said computed output signals continue for a predetermined period of time.

3. The pressure surge detecting circuit of claim 2 further including a combinational logic device connected to receive said output signal and said computed output signal, said timer means being connected to the output of said combinational logic device.

4. The pressure surge detecting means of claim 3 wherein said combinational logic device is an OR gate.

5. The pressure surge detecting means of claim 2 further including a second combinational logic device connected to said memory circuit means to receive said computed output signals, and a third combinational logic device connected to receive the output from said amplitude detector means and said second combinational logic device, and a fourth combinational logic device connected to receive the output from said timer means and said third combinational logic device for generating said alarm signal in response to the simultaneous occurrence of an output signal from said timer means and one of said amplitude detector means and said second combinational logic device.

6. The pressure surge detecting circuit of claim 5 wherein said second combinational logic device is an AND gate, said third combinatinal logic device is an OR gate and said fourth combinational logic device is an AND gate.

7. The pressure surge detecting the circuit of claim 6 further including AND gate connected to receive the output from said timer means and to receive said computed output signal for generating said alarm signal in response to the simultaneous occurrence of said computed output signals and an output signal from said timer means.

8. For use in a pressure measuring system which includes a pressure transducer for generating an instantaneous analogue signal as a function of pressure, means for generating non-linear error signal as a function of the difference between the input signal and a feedback signal, and means including a feedback circuit for generating said feedback signal as a function of said error signal for nulling said error signal and generating a digital output signal as a function of said pressure, a pressure surge detecting circuit comprising; digital computing circuit means connected to receive said digital output signal for computing the rate of change of said pressure and the change in said pressure, memory circuit means for storing predetermined maximum values of the rate of change and change in pressure at predetermined initial values of said pressure said computing circuit means further including means for comparing the computed values of said rate of change and change in pressure to said predetermined stored values thereof and generating computed output signals when both are in excess of said stored values, and timer means connected to receive one of said computed output signals for generating an alarm signal when said one of said computed output signals continues for a predetermined period of time.

9. The pressure surge detecting circuit of claim 7 further including amplitude detector means connected to said pressure measuring system to receive said error signal for generating an output signal when said error signal is equal to and greater than a predetermined magnitude, said timer circuit means being connected to receive said output signal, and further including a combinational logic device connected to receive the output signal from said timer means and said amplitude detector means for generating an alarm signal in response to the simultaneous occurrence of signals therefrom.

10. The pressure surge detecting circuit of claim 9 wherein said combinational logic device is an AND gate.

11. For use in a pressure measuring system which includes a pressure transducer for generating an instantaneous analogue signal as a function of pressure, means for generating an error signal as a function of the difference between non-linear input signal and a feedback signal, and means including a feedback circuit for generating said feedback signal as a function of said error signal for nulling said error signal and generating a digital output signal as a function of said pressure, a pressure surge detecting circuit comprising; amplitude detector means connected to said pressure measuring system to receive said error signal for generating an output signal when said error signal is equal to and greater than a predetermined magnitude, digital computing circuit means connected to receive said digital output signal for computing the rate of change of said pressure and the change in said pressure, memory circuit means for storing predetermined maximum values of rate of change and change in pressure, respectively, at predetermined initial values of said pressure, said computing circuit means further including an output and means for comparing the computed values of said rate of change and change in pressure to said predetermined stored maximum values thereof, and generating computed output signals when both are in excess of said stored maximum values, a first combinational logic device connected to the output of said computing means for generating a second output signal in response to the simultaneous occurrence of said computed output signals, timer means connected to receive said output signals and one of said computed output signals for generating an alarm signal when said computed output signal or said output signal continues for a predetermined period of time.

* * * * *